(No Model.)
P. P. MAST.
GRAIN DRILL.
No. 410,325. Patented Sept. 3, 1889.
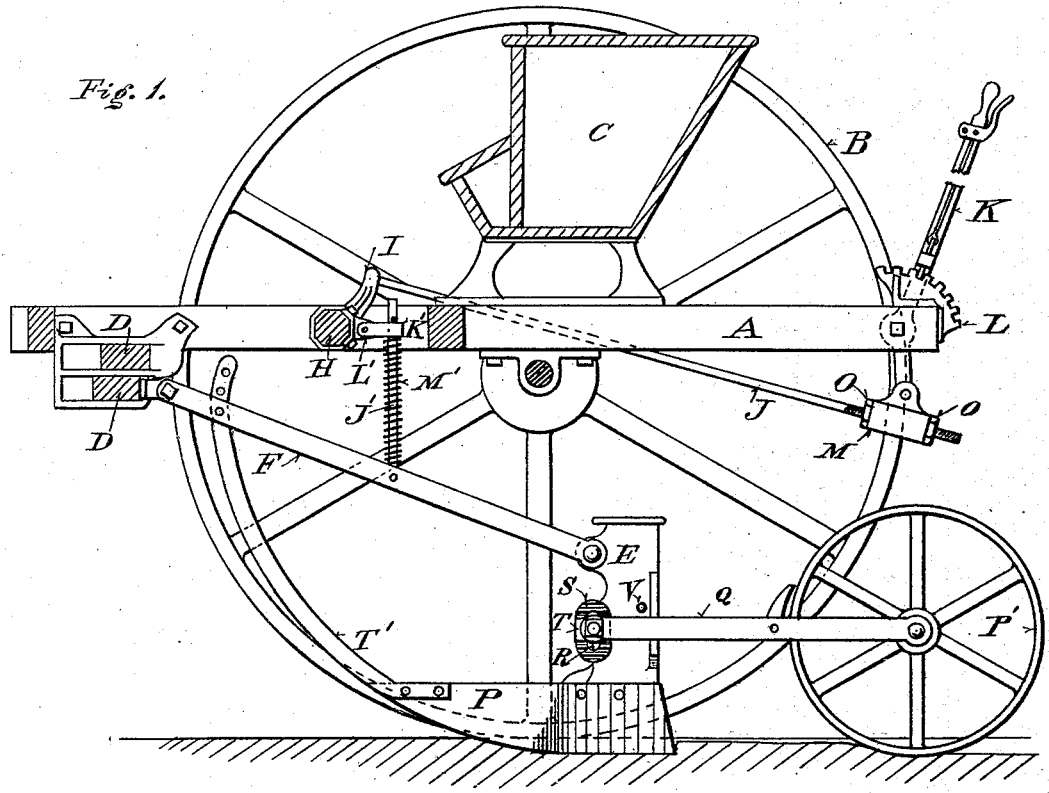
Fig. 1.
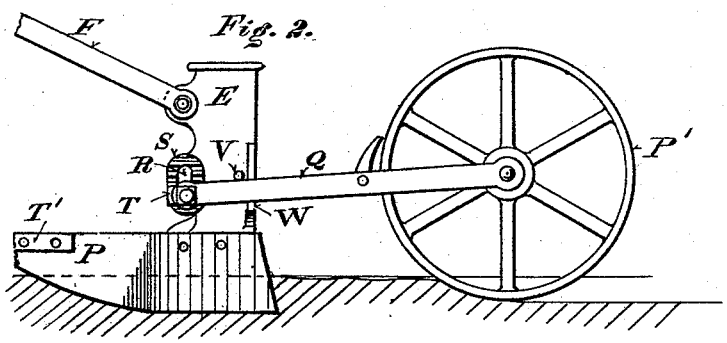
Fig. 2.
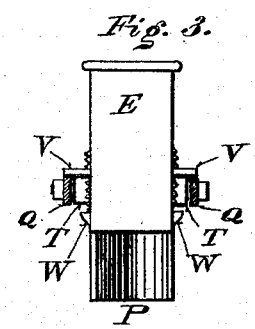
Fig. 3.
Fig. 4.
WITNESSES:
H. M. Plaisted.
Warren Hull.
INVENTOR
Phineas P. Mast,
BY H. A. Toulmin,
HIS ATTORNEY.

UNITED STATES PATENT OFFICE.

PHINEAS P. MAST, OF SPRINGFIELD, OHIO, ASSIGNOR TO P. P. MAST & COMPANY, OF SAME PLACE.

GRAIN-DRILL.

SPECIFICATION forming part of Letters Patent No. 410,325, dated September 3, 1889.

Original application filed February 16, 1889, Serial No. 300,131. Divided and this application filed June 8, 1889. Serial No. 313,592. (No model.)

*To all whom it may concern:*

Be it known that I, PHINEAS P. MAST, a citizen of the United States, residing at Springfield, in the county of Clark and State of Ohio, have invented certain new and useful Improvements in Grain-Drills, of which the following is a specification, reference being had therein to the accompanying drawings.

This invention relates to certain new and useful improvements in grain-drills; and the object of the invention is to render this class of instruments more useful in planting grain in soil where the climatic conditions expose the soil to violent sweeping tempests or wind-storms, amounting at times to hurricanes, which blow and upturn the soil to such an extent as to expose the grain and completely unplant it when drilled at the ordinary depths and covered in the usual way. The soil where some of these climatic conditions exist is of a light, sandy nature, rendering it easily disturbed and scattered by these winds. I have in view, therefore, the drilling of the soil to a greater depth than usual, and planting the grain at such increased depth, and packing the soil down firmly.

With these ends in view my invention consists of the combinations, arrangements, and structural features hereinafter more fully described, and pointed out in the claims.

In the accompanying drawings, forming a part of this specification, and in which like reference-letters indicate corresponding parts, Figure 1 represents a partial section and side elevation of a grain-drill with some of its features removed, but showing my improvements applied thereto; Fig. 2, a side elevation of my improvements, showing the hoe and packing-wheel depressed to a usual depth; Fig. 3, a rear elevation of the hoe with the wheel-connecting bars in section, and Fig. 4 a plan view of the runner above.

The letter A designates the frame of any approved grain-drill—preferably of the type manufactured and put on the market by my assignees herein, P. P. Mast & Company, of Springfield, Ohio—and mounted on wheels B, (one only of which is shown,) and having the usual grain-box C. The grain-dropping instrumentalities are not illustrated, because they do not enter into the subject-matter of the present invention, and are not necessary to an understanding of the latter.

To the forward portion of the frame, as to the transverse bars D, are secured first one and then the other of the hoes E, by the usual drag bars or beams F. The connection between the hoe and these beams is pivotal.

A rock-shaft H is mounted in the frame A and manipulated through an arm I, a pitman J, and a locking-lever K, whose detent engages with the notched segment-plate L. The connection between the locking-lever K and the pitman J is preferably adjustable through a sleeve M and nuts O on the pitman J.

To the bars F is pivotally connected a rod J', whose upper portion slidingly fits a collar K', connected by a short arm L', carried by the rock-shaft H. A spiral spring M' is coiled about this rod and interposed between the bar F and collar K', so as to exert a strong downward pressure. By these means the hoes may be depressed to different depths in the soil, so as to drill the seed more or less deeply.

The letter P designates a runner upon which the hoe is mounted, the runner consisting of two metallic—preferably steel—plates curved upward on their lower edges at their forward ends, and flaring apart from a suitable point on their length toward their rear ends. As the machine proceeds forward, this runner opens or drills the soil to receive the grain, which is descending through the hoe. When thus deposited, it is packed by the wheel, now about to be described. The letter P' designates this packing-wheel, the function of which, as above suggested, is to pack the grain and the soil about it firmly down in the furrow made by the runner, and whose further function is to limit the descent of the runner when undergoing great depressing force from the depressing-spring, above alluded to, so that while the runner is thus depressed low into the ground, and held there, its thin lower edges are not pressing downward upon the soil, but are simply secured to a given depth, limited by the supporting action of the wheel P', through the intermediate devices about to be described, and held down by the depressing-spring. These devices consist of connecting-bars Q, mounted on the wheel-spindles and pivotally and adjustably connected at their free ends to the hoe—one at either side. The hoe is slotted, as seen at R, and has a serrated surface S about said slot, with which to interlock the serrated washer T, interposed between the bars R and the surface S. These bars may be adjusted up and down by loosening the connecting-bolt and changing the position of the washers T on the surfaces S for the purpose of locking the bars Q more or less nearly to the depressing-studs V, cast or otherwise connected with the hoe. The hoe is further provided with lifting-lugs W, whose function is to engage the inner edges of the bars Q, and lift the wheels P' from the ground for convenience in turning around and removing the shoe from place to place when not in operation.

In Fig. 1 I have illustrated the runner and wheel, the wheel packing the soil by its weight. In Fig. 2 I have illustrated the runner as depressed to an unusual depth, and the wheel at a corresponding depth, with the studs V forcibly engaging the bars Q, so as to transfer the depressing force of the spring through the hoe to the wheel, and so as to limit the descent of the runner, as already alluded to. It will be observed that the bars Q are adjusted lower down with respect to the slot R in Fig. 2 than in Fig. 1. The higher this adjustment the sooner the bar will arrest the hoe and runner in their descent, and therefore, by means of this adjustment, a positive forward limit of the hoe and runner may be varied to suit particular circumstances.

The machines constructed in accordance with this invention work with entire satisfaction, planting the grain at a safe depth and packing it and the soil well and firmly down, and fully complying with the necessities of the soil and climatic conditions hereinbefore alluded to. The forward end of the runners is adjustably connected through a bar T' with the bar or beam F, and the preferred construction for carrying out this adjustable connection is that illustrated, consisting of a series of holes in the upper forward end of the bar T' and a hole in the bar F, through which a pin is inserted. The adjustability between the bar or beam F and the bar T' is to admit of changing the inclination of the runner P to run more or less deeply into the soil.

The wheel-connecting bars might be attached to the runner, if desired, without in any manner departing from my invention.

This case is a division of my application upon which were issued Letters Patent No. 404,853, June 11, 1889, for improvements in grain-drills, to my assignees, Messrs. P. P. Mast & Co.

Having thus fully described my invention, what I claim as new, and desire to secure by Letters Patent, is—

1. In a grain-drill, the combination, with the main frame, a hoe, and a runner upon which the hoe is mounted, a bar connecting the hoe with the said frame, and an adjustable connection for the forward end of the runner to change its inclination, of a grain and soil packing wheel and its connecting-bars, and devices to depress the wheel and the runner.

2. In a grain-drill, the combination, with a hoe and a runner upon which it is mounted, the same being connected with the frame of the machine, and devices to depress the hoe into the ground, of a grain and soil packing wheel and its connecting-bars pivotally attached to the hoe, and a lateral projection on the hoe above and below said bars, the one to transfer the pressure on the hoe to the wheel, and the other to lift the wheel with the hoe.

3. In a grain-drill, the combination, with a hoe and a runner upon which it is mounted, a beam connecting the hoe with said frame, and a bar adjustably connecting the forward end of the runner with said beam, of a grain and soil packing wheel and its connecting-bars pivotally attached to the hoe, and a lateral projection on each side of the hoe above and below said bars, the one to transfer the pressure on the hoe to the wheel, and the other to lift the wheel with the hoe.

4. In a grain-drill, the combination, with the main frame, a hoe and a runner upon which the hoe is mounted, a bar connecting the hoe with the said frame, and an adjustable connection for the forward end of the runner to change its inclination, of a grain and a soil packing wheel and its connecting-bars pivotally attached to the hoe, and devices to depress said wheel by the depression of said hoe.

In testimony whereof I affix my signature in presence of two witnesses.

P. P. MAST.

Witnesses:
H. M. PLAISTED,
WARREN HULL.